March 10, 1959 G. J. DUFAULT 2,877,379

AUTOMATIC FREQUENCY CONTROL APPARATUS

Filed Dec. 24, 1954 2 Sheets-Sheet 1

INVENTOR.
George J. Dufault
BY
Mason, Kolehmainen, Rathburn & Wyss
ATTORNEYS

INVENTOR.
George J. Dufault
BY
Mason, Kolehmainen, Rathburn & Wyss
ATTORNEYS

United States Patent Office 2,877,379

Patented Mar. 10, 1959

2,877,379

AUTOMATIC FREQUENCY CONTROL APPARATUS

George J. Dufault, Lancaster, N. Y., assignor to Sylvania Electric Products, Inc., a corporation of Massachusetts Application December 24, 1954, Serial No. 477,453

8 Claims. (Cl. 315—27)

Figure 1:
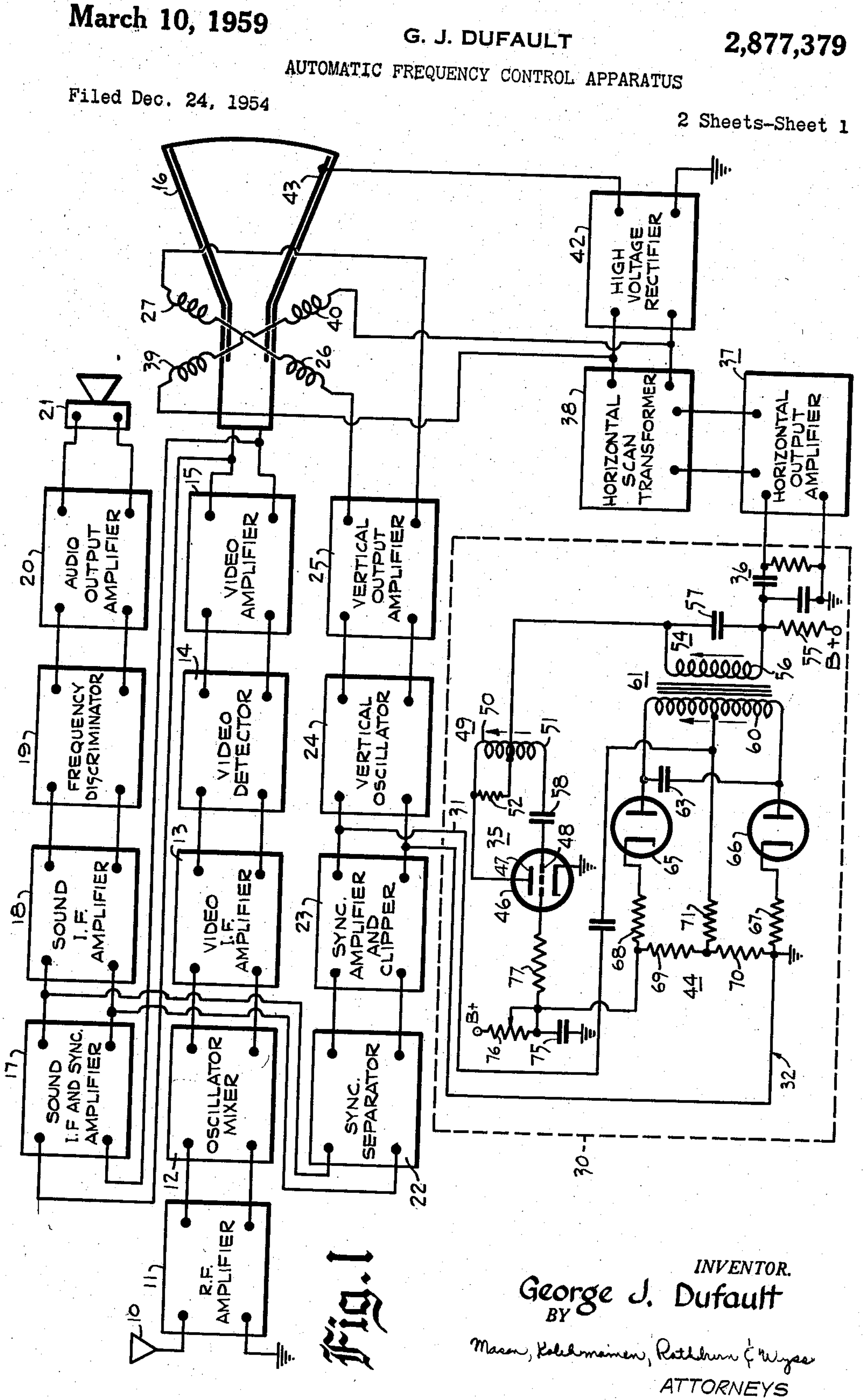

The present invention relates to automatic frequency control apparatus and has for a principal object the provision of improved apparatus for synchronizing the output wave from a horizontal scan oscillator with received synchronizing pulses. Whereas the automatic frequency control apparatus of the present invention is described in connection with the horizontal sweep voltage generating circuits of a monochromatic television receiver, it will be understood that this application has been chosen merely by way of illustration, and in no sense by way of limitation, since the present apparatus has utility in many other applications, such, for example, as in color television receivers.

In order to provide a satisfactory image on the face of the picture tube of a television receiver, the scansions of the cathode ray beam in the picture tube must be accurately synchronized with respect to the scansions of the cathode ray beam in the camera tube so that the picture element being reproduced at the receiver corresponds in location on the receiver screen to the location of that same element on the camera tube object screen. To effect this synchronization, a synchronizing pulse wave is modulated on the transmitted carrier and is employed at the receiver to synchronize the scansions of the cathode ray beam in the picture tube with the scansions at the camera. In accordance with present day television standards, the synchronizing wave is a periodic pulse wave wherein one pulse is provided for each horizontal scansion of the electron beam. Because, however, noise disturbances frequently add to the synchronizing pulses prior to the time the transmitted wave is received at the receiver, it is important that the synchronizing means provided at the receiver be responsive only to the synchronizing pulses and not to the noise disturbances.

In order to produce at the receiver a sweep voltage wave at a frequency and phase substantially independent of noise components in the received signal, it is known in the prior art to provide a local oscillator at the receiver which operates at approximately the frequency at which it is desired to sweep the cathode ray beam across the face of the picture tube. The received synchronizing pulses are employed to maintain the frequency and phase of the output wave from this local oscillator in synchronism with the sweep of the cathode ray in the camera tube at the transmitter. To utilize the received synchronizing pulse wave to synchronize the receiver local oscillator, it is also known in the prior art to compare the relative phases and frequencies of the synchronizing wave and the horizontal sweep signal wave to provide a control signal for adjusting the frequency and phase of the output wave from the horizontal sweep oscillator. Although such arrangements provide relatively good synchronization, they require the use of a large number of both static and dynamic circuit components.

Therefore, another object of the present invention is to provide a new and improved apparatus for synchronizing a periodic sweep voltage wave with a received synchronizing pulse wave which minimizes the number of circuit components and, consequently, reduces the manufacturing cost of a receiver.

Still another object of the present invention is to provide new and improved apparatus for synchronizing the line sweep generator in a television receiver with a received synchronizing pulse wave.

Yet another object of the present invention is to provide an automatic frequency control circuit for synchronizing the horizontal sweep voltage generator with respect to received synchronizing pulses.

A further object of the present invention is to provide an automatic frequency control system for stabilizing the horizontal sweep voltage generator of a television receiver which is relatively non-responsive to noise in the synchronizing wave and which, in addition, maintains the sweep voltage frequency constant irrespective of fluctuations in the power supply voltage.

A still further object of the present invention is to provide new and improved apparatus for accomplishing these hereinbefore mentioned objects with a smaller number of circuit components and at a lower cost than in prior art arrangements.

Briefly, in accordance with one aspect of the present invention, there is provided an AFC system wherein a passive oscillatory circuit is tuned to approximately the natural frequency of the horizontal oscillator to be controlled. This oscillatory circuit is so connected as to be shock-excited by an output wave derived from the oscillator and stabilizes the frequency thereof. The oscillation wave developed in this passive oscillatory circuit is also inductively coupled to a conventional phase detector circuit wherein it is compared in phase and frequency with the horizontal synchronizing pulse wave. There is thus provided at the output terminals of the phase detector a substantially unidirectional voltage signal which is indicative of the phase and frequency relationship of the oscillator output and synchronizing waves.

Figure 2:
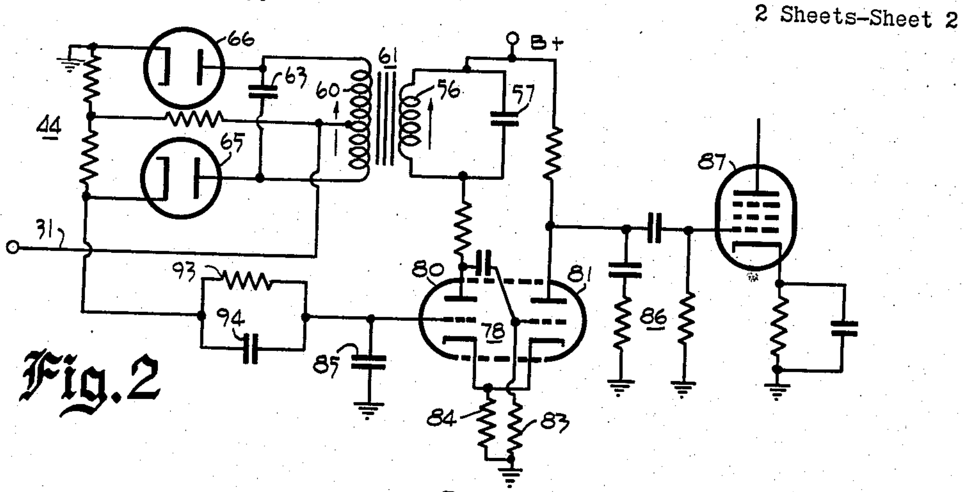
Figures 3, 4:
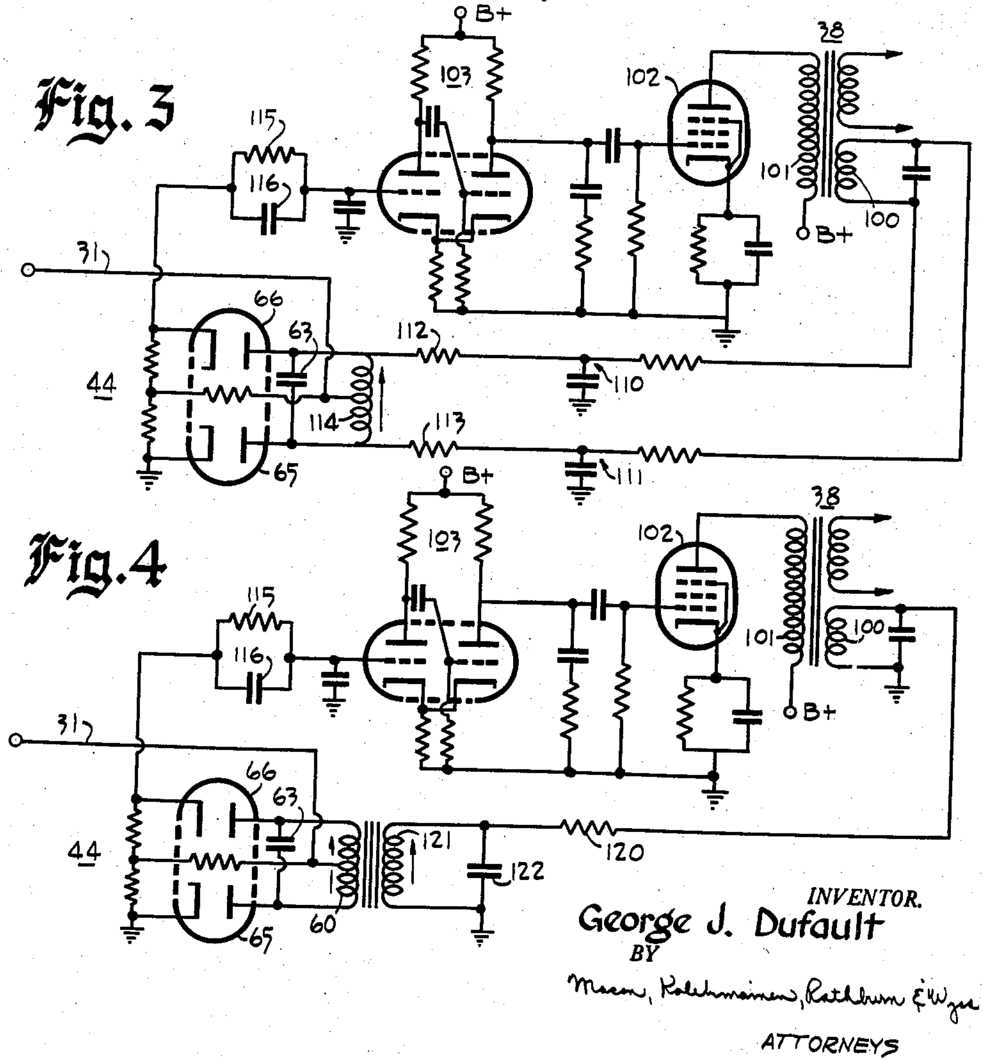

Additional objects and advantages and a better understanding of the present invention will become apparent with a consideration of the following description and accompanying drawings wherein:

Fig. 1 is a circuit diagram of a monochromatic television receiver embodying an AFC system incorporating certain aspects of the present invention; and Figs. 2, 3 and 4 are circuit diagrams of alternative embodiments of the present invention.

Referring to the drawings and particularly to Fig. 1, there is illustrated a monochromatic television receiver incorporating an automatic frequency control circuit of the present invention, wherein the standard components of the receiver are shown in block diagram form. The receiver includes a conventional television receiving antenna 10 which is adapted to receive a video modulated carrier wave and an audio modulated carrier wave. These received carrier waves are amplified in an R. F. amplifier stage 11 and selected and amplified in an oscillator-mixer stage 12. The received video and audio carrier waves are reduced to waves of intermediate frequency in the oscillator mixer 12 and are amplified in a conventional video I. F. amplifier 13. The amplified intermediate frequency modulated carrier waves are then applied to a video detector 14 wherein the video intermediate frequency carrier wave is removed therefrom and the video signal together with the synchronizing wave and the audio modulated intermediate frequency carrier wave is amplified in a video amplifier 15 from which the video portion of the derived wave is applied to the electron gun of a cathode ray picture tube or kinescope 16 to control the intensity of the cathode ray beam in accordance with the instantaneous amplitude of the video signal. That portion of the wave derived from the video amplifier 15 which includes the synchronizing wave and the audio modulated intermediate frequency carrier wave is applied to a sound intermediate frequency and synchronizing amplifier 17 from the output of which the sound intermediate frequency carrier wave is coupled to the sound intermediate frequency amplifier 18, wherein it is amplified, and then applied to a frequency discriminator circuit 19. In the discriminator 19 the sound intermediate frequency carrier wave is removed from the audio modulated wave and the audio signal is supplied to an audio output amplifier 20 to drive a loudspeaker 21.

The synchronizing wave which appears in the output of the sound I. F. and synchronizing amplifier 17 is applied to a sync separator circuit 22 and then to a sync amplifier and clipper 23, which provides at the output terminals thereof a vertical synchronizing pulse wave which is utilized to control the vertical oscillator 24. The sync amplifier and clipper 23 also provides a horizontal synchronizing wave which is utilized to control the frequency of the horizontal oscillator and AFC circuit 30 in a manner more fully described hereinafter. The output signal from the circuit 30 is supplied to a conventional horizontal output amplifier 37 and transformer 38 for supplying the scanning current to the horizontal deflection coils 39 and 40 and for application to a conventional high voltage rectifier 42 for the supplying of a unidirectional energizing voltage to the accelerating anode 43 of the picture tube 16. The output of the vertical oscillator 24 is amplified in a vertical output amplifier 25 and applied to conventional vertical deflection coils 26 and 27 of the kinescope 16. The portions of the television receiver described thus far with the exception of the circuit 30 are well known and do not constitute a part of the present invention. Therefore, it will be understood that other similar receiver circuits may be used to replace the described circuits without departing from the present invention.

The circuit 30 of the present invention is supplied with a horizontal synchronizing pulse wave from the sync amplifier and clipper 23 by means of a conductor 31. Another conductor 32 interconnects the ground connection of the circuit 30 with the corresponding output terminal of the sync amplifier and clipper 23. The circuit 30 generally includes an oscillator 35 which produces a periodic wave at substantially the frequency at which it is desired horizontally to sweep the cathode ray beam across the face of the kinescope 16; an integrating and coupling circuit 36 for converting the periodic wave from the oscillator 35 into a serrated or saw tooth wave and a horizontal output amplifier 37 for amplifying this saw tooth wave. A phase comparator circuit 44 is supplied with the horizontal synchronizing wave and also with a sine wave which is derived from the output wave of the horizontal sweep oscillator 35, and develops a control voltage which is supplied to the oscillator 35 for synchronizing the frequency of oscillation thereof with the received synchronizing wave.

In detail, the oscillator 35 is of the blocking oscillator type and includes a triode 46 having an anode 47 and a control electrode 48 which are inductively coupled together through a transformer 49 having a primary winding 50 in the anode circuit and a secondary winding 51 in the control electrode circuit. This transformer may conveniently comprise a tapped coil. As illustrated, the coupling between the primary and secondary windings of the transformer 49 is adjustable. A damping resistor 52 is provided across the primary winding 50, and in the particular type of blocking oscillator illustrated, the tap on the transformer 49 is connected through a resonant tuned circuit 54 and an anode resistor 55 to a source of unidirectional voltage. The circuit 54 comprises an inductor 56 and a capacitor 57 connected in parallel and tuned to a frequency slightly higher than the horizontal synchronizing pulse frequency to stabilize the operation of the oscillator 35 by increasing the slope of the grid voltage waveform developed across the capacitor 58 at the grid voltage cutoff point of the tube 46.

The output wave from the blocking oscillator 35, is conventionally, a series of pulses which, when supplied to the integrating network 36 produce a saw tooth pulse for each pulse of the blocking oscillator. Although it is possible to compare directly a saw tooth wave or a pulse wave with the received synchronizing pulses to provide a signal for controlling the frequency and the phase of oscillation of the horizontal sweep oscillator, it has been determined in the prior art that more satisfactory results are obtainable when the synchronizing pulses are compared with a sine wave which is derived from the output wave of the sweep oscillator. Consequently, the synchronizing wave, which as hereinbefore explained is a plurality of pulses, is supplied through the conductor 31 from the sync amplifier 23 to a center tap on a secondary winding 60 of a transformer 61 wherein the primary winding 56 thereof constitutes the inductor of the resonant circuit 54. Accordingly, there is developed across the secondary winding 60 a sine wave of voltage which is in adjustable constant phase relationship with and at the frequency of the periodic wave from the blocking oscillator 35. A capacitor 63 is connected across the secondary winding 60 to tune the same to the horizontal frequency and to provide increased noise immunity due to the well known flywheel effect of a resonant circuit.

The remaining portions of the phase comparator circuit 44 are conventional and include a pair of diodes 65 and 66 which are connected in series opposition relationship across the primary winding 60. The cathode of the diode 66 is connected through a resistor 67 to ground and the cathode of the diode 65 is connected through resistors 68, 69 and 70 to ground. A resistor 71 interconnects the junction between the resistors 69 and 70 with the center tap of the transformer secondary winding 60. As is well known in the art, a signal is developed between the junction of resistors 68 and 69 and ground which is indicative of the phase relationship between the synchronizing pulses supplied to the center tap of the secondary winding 60 and the sine wave of voltage which is produced thereacross. This signal is integrated in the capacitor 75 and is coupled through a resistor 77 to the control electrode 48 of the blocking oscillator. Consequently, the direct current control voltage derived from the phase comparator circuit determines the frequency of operation of the blocking oscillator 35, and is so used to synchronize its operation with the horizontal synchronizing wave. Since the control grid of the tube 46 is normally biased negatively by the charge developed on the condenser 58, a voltage divider network is provided to cancel out the grid-leak bias voltage developed across resistors 69 and 70 in the AFC system. This network consists of resistor 76 in series with resistors 69 and 70 to a source of positive voltage. These resistors should have such values that with the oscillator operating at the proper frequency, the potential at the junction of resistors 68 and 69 should be approximately zero. This biasing voltage will have no effect on the control voltage developed across resistors 69 and 70.

It will thus be seen that the tuned circuit 54, which is normally employed solely for frequency stabilization, is, in accordance with the present invention, also employed as a source of sine wave voltage in synchronism with the periodic wave of the blocking oscillator 35 which is coupled to the conventional phase comparator circuit 44 through the transformer 61. The present invention thereby provides automatic frequency control of the horizontal sweep voltage without the necessity of employing a large number of discharge devices and expensive circuit components. Furthermore, due to the sinusoidal wave shape of the voltage developed across the winding 60 and the fact that both the primary and secondary windings 56 and 60 are tuned to resonance, the AFC circuit is highly stable and is relatively nonresponsive to noise disturbances in the horizontal synchronizing wave. The transformer windings 56 and 60 may be loosely coupled so that the primary winding 56 may be adjusted for optimum stability of the blocking oscillator 35 and the secondary winding 60 may be adjusted for optimum phase relationship of the saw tooth wave supplied to the amplifier 37 and the incoming horizontal synchronizing pulses without these adjustments interacting and affecting each other. In the alternative, the condenser 57 may be omitted and the windings 54 and 60 of the transformer 61 tightly coupled so that the zero axis cross over point of the sine wave developed across the tuned circuit 60, 63 may be properly phased by adjustment of the inductance of the secondary winding 60, in which case the inductance of the primary winding 56 need not be variable. However, it will be understood that the circuit 60, 63 has a sufficiently low Q to permit following the maximum frequency variation of the incoming horizontal synchronizing pulses.

Referring to Fig. 2 there is shown an AFC circuit comprising another embodiment of the present invention in which a free running multi-vibrator type of relaxation oscillator 78 produces a sweep voltage wave which is employed in deflecting the cathode ray beam in a horizontal direction. In the circuit of Fig. 2 circuit elements which are identical to corresponding elements of Fig. 1 have been given the same reference numerals. The multi-vibrator 78 includes a pair of triodes 80 and 81 each having an anode, a cathode and a control electrode and wherein the anode of the device 80 is capacitively coupled to the control electrode of the triode 81. A bias voltage for the control electrode of the triode 81 is developed across a resistor 83 which connects this control electrode to ground. The usual common cathode resistor 84 is provided. The control electrode of the device 80 is connected to ground through a capacitor 85, and an output signal is taken off at the anode of the device 81 and coupled through a conventional RC integrating circuit 86 to the control electrode of a horizontal sweep signal output amplifier 87. Horizontal synchronizing pulses from the circuit 23 (Fig. 1) are connected over the conductor 31 to the phase comparator 44 and more particularly to the tap of the secondary winding 60 of a transformer 61. Transformer 61 includes a primary winding 56 which is tuned by means of a capacitor 57 to substantially the horizontal sweep frequency. The resonant frequency of the circuit 56, 57 may be varied by adjusting the inductance of the inductor 56. This static oscillatory circuit is connected in the anode circuit of the triode 80 and is rendered oscillatory by the pulses of energy supplied thereto each time that the triode 80 is rendered conductive. It may be seen therefor, that this resonant circuit is shock excited and produces an oscillation wave of current in the inductor 56 which is derived from the oscillation wave provided at the anode 81 of the oscillator. Such a resonant circuit is conventionally used with relaxation oscillators of this type to stabilize the frequency of oscillation thereof by increasing the slope of the grid voltage wave form as it passes through cut off. However, in accordance with the present invention this circuit is connected in the anode circuit or cathode circuit and utilizes the sine wave which appears therein to compare the phase relationship between the output of the horizontal sweep frequency oscillator 78 and the horizontal synchronizing wave. This is accomplished by inductively coupling the input winding 60 of the phase comparator circuit 44 to the winding 56. In other respects the embodiment in Fig. 2 operates in substantially the same manner as does the embodiment of Fig. 1. The output control direct voltage from the phase comparator circuit 44 is coupled through an RC coupling nework compising a resist 93 and a capacitor 94 to the control electrode of the triode 80, to control the operating bias thereon and thereby to synchronize the relaxation oscillator with the received horizontal synchronizing wave. Since the control grid of the tube 80 does not draw grid current, no positive biasing network is required.

Referring to Fig. 3, there is illustrated another embodiment of the present invention wherein a sine wave of voltage is derived from an auxiliary winding 100 of the sweep frequency transformer 38. A primary winding 101 of transformer 38 is driven by a horizontal output amplifier 102, which is supplied with a saw tooth wave signal from a conventional relaxation oscillator 103 shown and described herein as a multi-vibrator, but which may be a blocking oscillator or any other type of oscillator from which the saw tooth sweep voltage may be derived. At the termination of each sweep of the cathode ray beam across the face of the kinescope. pulses of large amplitude are developed across the winding 101 due to interruption of current therethrough and corresponding pulses are induced in the winding 100 which are coupled to the phase comparator circuit 44 through the integrating networks 110 and 111. In this embodiment neither side of the winding 100 is referred to ground so that a double ended signal is supplied across the input inductor 114 of the phase comparator circuit 44. The saw tooth waves which appear across the capacitors of the integrating networks 110 and 111 are coupled through the resistors 112 and 113, respectively, to the tuned circuit comprising the inductor 114 and the capacitor 63 wherein is developed, by shock excitation, a sine wave voltage. This voltage is compared with the horizontal synchronizing wave applied through the conductor 31 to the center tap of the inductor 114 to provide a D. C. control voltage at the cathode of the diode 66 which is coupled through an RC network comprising a resistor 115 and a capacitor 116 to the control electrode of one of the triodes of the multi-vibrator 103 for synchronizing the operation thereof with the horizontal synchronizing wave. In this embodiment the AFC circuit does not employ an additional transformer since the horizontal scan transformer which is necessarily provided in any television receiver is utilized to couple a portion of the sweep frequency wave to the phase comparator circuit. The tuned circuit of the phase comparator circuit itself, which includes the inductor 60 and the capacitor 63, is employed for converting these pulses into a sine wave for accurate comparison with the synchronizing pulse wave.

The embodiment of Fig. 4 is in most respects like the circuits of Fig. 3 and similar components have been assigned like numerals. In the embodiment of Fig. 4, however, a single ended wave is derived from the winding 100 and inductively coupled to the phase comparator circuit for comparison with the received synchronizing pulses. In detail, the pulses which appear across the winding 100 are coupled through a resistor 120 to a tank circuit, including an inductor 121 and a capacitor 122, which is shock-excited into oscillation and produces therein a sine wave, voltage in synchronism with the sweep voltage wave. The signal so developed in the inductor 121 is inductively coupled to the winding 60 of the phase comparator circuit 44. In this embodiment the secondary winding 60 is adjusted properly to phase the synchronizing pulse wave applied through the conductor 31 with the reference wave appearing across the inductor 60, and the inductor 121 is adjustable to tune the tank circuit thereof to the horizontal sweep frequency.

While the present invention has been described by means of particular embodiments thereof, it will be understood that those skilled in the art may make many changes and modifications without departing from the present invention. Therefore, in the appended claims it is intended to cover all such changes and modifications as fall within the true spirit and scope of this invention.

What is claimed as new and is desired to be secured by Letters Patent of the United States is:

1. In a television receiver AFC system for controlling the phase of the output of a relaxation generator with respect to received synchronizing pulses, the combination of a passive oscillatory circuit tuned to approximately the natural frequency of said generator, means for coupling the output of said generator to shock excite said oscillatory circuit, means for making a phase comparison between said synchronizing pulses and the wave developed in said oscillatory circuit, means responsive to the phase difference between said wave and said pulses for producing a control signal, and means responsive to said control signal for adjusting the frequency of the output of said generator to correct for any undesired phase and frequency difference.

2. A television receiver AFC system comprising a blocking oscillator including an amplifier and an inductance coupling means interconnecting the input and output of said amplifier, sine wave generating means connected in the output of said amplifier, externally of the feedback path of said oscillator, for stabilizing the output frequency thereof, a phase detector including an input circuit inductively coupled to said sine wave generating means, a source of a synchronizing pulse wave, means for coupling said pulses to said detector, means for deriving from said detector a direct voltage having a magnitude dependent upon the relative phases of said pulse wave and said sine wave, and means responsive to said direct voltage for adjusting the frequency of oscillation of said blocking oscillator.

3. A television receiver AFC system comprising a blocking oscillator including an amplifier and an inductance coupling means interconnecting the input and output of said amplifier, sine wave generating means including an inductance means connected in the output of said amplifier for stabilizing the output frequency thereof, a phase detector including an input circuit inductively coupled to said inductance means, a source of synchronizing pulses, means for coupling said pulses to said detector, means for deriving a direct voltage from said detector which has a magnitude dependent upon the phase relationship of said pulses with respect to said sine wave, and means responsive to said direct voltage for controlling the frequency of oscillation of said blocking oscillator.

4. A television receiver AFC system comprising a blocking oscillator including an amplifier and an inductance coupling means interconnecting the input and output of said amplifier, sine wave generating means including an inductance means connected in the output of said amplifier and which is shock excited by the output of said blocking oscillator, a phase detector including an input circuit inductively coupled to said inductance means, a source of synchronizing pulses, means for coupling said pulses to said detector, means for deriving a direct voltage from said phase relationship of said pulses and said sine wave, and means responsive to said direct voltage for adjusting the frequency of oscillation of said blocking oscillator.

5. A television AFC system comprising a relaxation oscillator including a normally conductive signal repeating device and a normally non-conductive signal repeating device, an oscillatory circuit serially connected with one of said devices, said circuit including an inductive means, a phase comparator circuit including an inductance, means for magnetically coupling together said inductive means and said inductance, a source of synchronizing pulses, means for coupling said pulses to said phase comparator circuit and means responsive to the phase difference between said pulses and a signal developed in said inductance for controlling the frequency of oscillation of said relaxation oscillator.

6. A television AFC system comprising a relaxation oscillator including first and second discharge devices each having an anode and a control electrode, an output circuit connected to one of said anodes, capacitive means interconnecting said one of said anodes to the control electrode of the other discharge device, a tuned circuit including an inductive means and a capacitive means, said tuned circuit being connected in the anode circuit of said discharge device, a phase comparator circuit including an inductance, means for magnetically coupling together said inductive means and said inductance, a source of synchronizing pulses, means for coupling said pulses to said phase comparator circuit and means responsive to the phase difference between said pulses and a signal developed in said inductance for controlling the frequency of oscillation of said relaxation oscillator.

7. In a television receiver, the combination of a generator of a pulsating waveform of voltage, said generator consisting of an oscillator including a regenerative feedback path, an integrating network, means exclusive of said feedback path for supplying said pulsating waveform of voltage to said integrating network, said means including a passive oscillatory circuit tuned to the desired frequency of said waveform of voltage for stabilizing the frequency of said waveform, a phase comparator means for supplying a train of synchronizing pulses to said comparator means, means connected directly between said passive oscillatory circuit and said comparator means for supplying a sinusoidal waveform of voltage from said passive oscillatory circuit to said comparator means for comparison with said synchronizing pulses, and means responsive to an output signal from said comparator means for controlling the frequency of oscillation of said oscillator.

8. In a television receiver employing a deflection means responsive to sweep signals supplied thereto for causing an electron beam to scan the screen of a television picture tube, the combination of oscillator means for developing a non-sinusoidal wave of voltage, said oscillator including a resonant feedback circuit interconnected between the input and output of an amplifier for controlling the frequency of oscillation of said oscillator, amplifier means, integrating means interconnected between the output of said oscillator and said amplifier means for converting the wave of voltage from said oscillator to a wave of like frequency having the necessary shape for application to said deflection means, a phase comparison network, means for supplying a train of synchronizing pulses to said network, a passive oscillatory circuit interconnected between said oscillator and said integrating means for developing a sinusoidal voltage having the frequency of said wave, said passive oscillatory circuit comprising a parallel LC resonant circuit having a sufficiently low Q to permit the frequency of said sinusoidal voltage to follow the maximum frequency variation of said synchronizing pulses, means for coupling said sinusoidal voltage to said phase comparison network for comparison with said train of synchronizing pulses, and means responsive to the phase difference between said train of pulses and said sinusoidal wave for controlling the phase of the output wave from said oscillator means.

References Cited in the file of this patent

UNITED STATES PATENTS

| | | |
|---|---|---|
| 2,551,308 | Adler | May 1, 1951 |
| 2,623,177 | Hugenholtz | Dec. 23, 1952 |